United States Patent
Ehrenberger et al.

(10) Patent No.: US 6,598,651 B2
(45) Date of Patent: Jul. 29, 2003

(54) CARGO AREA DIVIDER AND METHOD OF MAKING SAME

(75) Inventors: Marina Ehrenberger, Esslingen (DE); Holger Seel, Aidlingen (DE)

(73) Assignee: Bos GmbH & Co. KG., Aichwald (DE)

(*) Notice: Subject to any disclaimer, the term of this patent is extended or adjusted under 35 U.S.C. 154(b) by 0 days.

(21) Appl. No.: 10/217,218

(22) Filed: Aug. 12, 2002

(65) Prior Publication Data

US 2002/0185238 A1 Dec. 12, 2002

Related U.S. Application Data

(63) Continuation of application No. 09/609,364, filed on Jul. 3, 2000, now abandoned.

(30) Foreign Application Priority Data

Jul. 1, 1999 (DE) .......................................... 199 30 136

(51) Int. Cl.[7] .................................................. A42G 5/02
(52) U.S. Cl. ...................... 160/238; 160/265; 160/290.1
(58) Field of Search .............................. 160/238, 262, 160/265, 270, 290.1, 368.1, 370.21, 370.22; 296/95.1, 136, 152

(56) References Cited

U.S. PATENT DOCUMENTS

| | | | |
|---|---|---|---|
| 2,526,432 A | * 10/1950 | Svensson ............. | 160/290.1 X |
| 3,233,658 A | * 2/1966 | Riedel ................. | 160/290.1 X |
| 3,879,806 A | 4/1975 | Amstrong ............... | 24/73 CH |
| 3,958,826 A | 5/1976 | Upton .................... | 296/78 R |
| 4,344,474 A | 8/1982 | Berman .................. | 160/121 R |
| 4,869,542 A | 9/1989 | Lin ........................ | 296/97.8 |
| 5,067,546 A | * 11/1991 | Jeuffray et al. ......... | 160/23.1 |
| 5,271,634 A | * 12/1993 | Walton ................... | 280/33.992 |
| 5,290,086 A | 3/1994 | Tucker ................... | 296/152 |
| 5,409,286 A | 4/1995 | Huang .................... | 196/136 |
| 5,564,770 A | 10/1996 | Smith et al. ............ | 296/95.1 |
| 5,603,368 A | 2/1997 | Colson et al. .......... | 160/84.05 |
| 5,615,924 A | 4/1997 | Owen ..................... | 296/95.1 |
| 5,676,415 A | 10/1997 | Ament et al. ........... | 296/37.16 |
| 5,860,466 A | 1/1999 | Kao ....................... | 160/370.22 |
| 5,862,851 A | 1/1999 | Stoebich et al. ........ | 160/121.1 |
| 5,865,469 A | 2/1999 | Chin ...................... | 281/45 |
| 5,967,692 A | * 10/1999 | Tabellini ................ | 403/381 |
| 6,079,474 A | 6/2000 | Lin ........................ | 160/370.22 |
| 6,125,908 A | * 10/2000 | Ament et al. ........... | 160/323.1 |
| 6,324,797 B1 | 12/2001 | Fago et al. ............. | 52/222 |

FOREIGN PATENT DOCUMENTS

| | | | |
|---|---|---|---|
| DE | 42 39 472 C1 | 3/1994 | ......... B60R/21/06 |
| FR | 2 759 956 | 8/1998 | ......... B60R/21/06 |
| JP | 09086279 | 3/1997 | ......... B60R/5/04 |

* cited by examiner

Primary Examiner—Bruce A. Lev
(74) Attorney, Agent, or Firm—Greenberg Traurig, P.C.

(57) ABSTRACT

A cargo area divider, has a flexible planar structure that can be pulled out and is held at a rear end on a roller-shade shaft and at a front end is equipped with a pull-out bar that extends over the entire width of the planar structure. The pull-out bar is conformingly into a hollow chamber region of a cover profile extending at least over the width of the planar structure.

20 Claims, 2 Drawing Sheets

CARGO AREA DIVIDER AND METHOD OF MAKING SAME

This application is a continuation of application Ser. No. 09/609,364, filed Jul. 3, 2000, now abandoned.

BACKGROUND AND SUMMARY OF THE INVENTION

This application claims the priority of German Patent Document 199 30 136.0, filed Jul. 1, 1999, the disclosure of which is expressly incorporated by reference herein.

The present invention relates to a cargo area divider having a flexible planar structure that can be pulled out and is held at a rear end on a roller-shade shaft and at a front end is equipped with a pull-out bar that extends over the entire width of the planar structure.

Cargo area dividers of this kind are commonly known, in particular as divider nets for station wagons. A divider net of this kind is held as a flexible planar structure on a roller-shade shaft, and can be wound onto said roller-shade shaft by corresponding rotation of the roller-shade shaft. The roller-shade shaft is arranged in a cassette housing positioned immovably on the vehicle, from which the divider net can be pulled out upward. In order for the divider net to be pulled out, the divider net has in the region of its front end a pull-out bar that extends over the entire width of the divider net and is equipped laterally with hooking elements for securing the pull-out bar in retainers mounted immovably at the roof of the vehicle. When the divider net is in the pulled-in state, the pull-out bar rests on the cassette housing at the height of a corresponding longitudinal slot. The pull-out bar is arranged in a pocket at the end of the divider net that is formed by wrapping the end of the divider net around and correspondingly stitching it, optionally with the aid of an additional reinforcing material.

It is the object of the invention to create a cargo area divider of the kind cited initially that makes possible an improved configuration of the front end of the planar structure.

This object is achieved in that the pull-out bar is integrated conformingly into a hollow chamber region of a cover profile extending at least over the width of the planar structure. The pull-out bar is thus concealed, i.e., accommodated invisibly inside the cover profile. The cover profile can be adapted in terms of its visual appearance to the interior fittings of the motor vehicle, or can fit integrally into the external appearance of a cassette housing of the cargo area divider. The front end of the planar structure is thereby given a substantially improved, uniform visual conformation. The fact that the pull-out bar is conformingly received in the cover profile ensures that even in the event of a crash, the pull-out bar is prevented from being detached from the cover profile. The conforming arrangement is thus referred to the pulling direction of the planar structure. Since the pull-out bar is invisibly integrated into a front end of the planar structure in the cover profile, the visual requirements applicable to the joint between the planar structure and the pull-out bar are not very stringent. A functionally secure joint is sufficient.

In certain preferred embodiment of the invention, the hollow chamber region of the cover profile has the same cross section continuously over its entire length, and is open toward both lateral ends. The hollow profile can be configured either entirely as a hollow profile or only with a groove-shaped hollow chamber region and otherwise as a solid profile. The continuously uniform conformation of the cover profile makes it possible to use an endless extruded profile. The cover profile is advantageously manufactured from plastic or from a lightweight metal alloy.

In certain preferred embodiment of the invention, the hollow chamber region is equipped with a longitudinal slot, continuous over its length and open toward the outside, whose width is smaller than a cross-sectional dimension of the pull-out bar. The purpose of this longitudinal slot is to ensure that the flexible planar structure, in particular the divider net, can pass through. Preferably the pull-out bar, when it is already joined to the divider net, is slid together with the divider net, from one lateral end, into the hollow chamber region of the cover profile; this in itself ensures secure positioning of the pull-out bar in the pulling direction of the planar structure, i.e. in the pulling direction of the divider net.

In certain preferred embodiment of the invention, a closure panel which closes off the hollow chamber region is associated with each of the opposite lateral ends of the cover profile. The closure panel can extend either only over the hollow chamber region or over the entire cross section of the cover profile. The overall visual impression of the cover profile is further improved by these closure panels. In a further embodiment of the invention, the pull-out bar extends outward on both sides beyond the lateral ends of the cover profile, and is equipped with hooking elements for retention in vehicle-mounted retainers. This is a particularly simple and reliably functioning configuration; depending on the conformation of the hooking elements, provision must be made for subsequent attachment to the lateral ends of the pull-out bar after the pull-out bar has been slid into the cover profile.

In certain preferred embodiment of the invention, the cover profile is equipped at its opposite lateral ends with hooking elements for retention in vehicle-mounted retainers. Corresponding hooking elements on the pull-out bar are thus not necessary.

In certain preferred embodiment of the invention, the hooking elements are provided on the closure panels. With this arrangement, it is necessary to ensure that the closure panels are anchored on the lateral ends of the cover profile sufficiently securely that detachment of the closure panels from the cover profile is prevented even in the event of a crash.

Other objects, advantages and novel features of the present invention will become apparent from the following detailed description of the invention when considered in conjunction with the accompanying drawings.

DETAILED DESCRIPTION OF THE DRAWINGS

Figure 5:
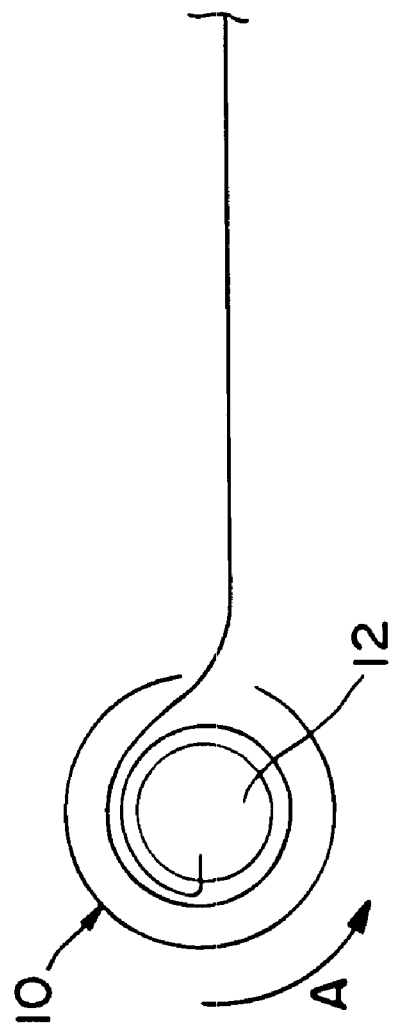
FIG. 5 is a side elevation, of a cargo divider, according to the embodiment of FIGS. 1 and 2, showing the housing for the roller-shade shaft.

A cargo area divider for a station wagon has, as a flexible planar structure, a divider net 1 that is held, in a manner that is depicted in one possible manner schematically in FIG. 5, so as to wind onto and out from a roller-shade shaft. The roller-shade shaft is rotatably mounted in vehicle-mounted retainers; alternatively, the roller-shade shaft is arranged either directly via corresponding side elements in the vehicle-mounted retainers, or indirectly by integration into a housing, preferably a cassette housing. Provided at one front end of divider net 1 is a pull-out bar 2 that, in the exemplary embodiment shown in FIGS. 1 and 2, has an elongated, almost oval cross-section. Pull-out bar 2 is embedded in a pocket of the front end of divider net 1 around and joining the end edge in planar fashion to a region of the divider net located farther inside, in particular by stitching. Pull-out bar 2 is integrated into a cover profile 4 that is equipped, as a hollow profile, with a G-shaped cross section. Cover profile 4 has, continuously over its entire length, a hollow chamber region 7 that is open at its opposite lateral ends. Hollow chamber region 7 is moreover open toward the bottom, over its entire length, by way of a labyrinth-like longitudinal slot 6. Hollow chamber region 7 has an elongated hollow cross-section that is adapted to the elongated oval dimensions of pull-out bar 2. In its state embedded into the pocket of divider net 1, pull-out bar 2 together with divider net 1 is slid from one lateral end into hollow chamber region 7 of cover profile 4, the divider net passing out downward through longitudinal slot 6. In hollow chamber region 7, pull-out bar 2 is wrapped around over an angle of almost 180° and is protected conformingly from being pulled out downward in the pulling direction of divider net 1 by an internal limb of cover profile 4. In addition, the width of longitudinal slot 6 is smaller than the thickness of pull-out bar 2, thus creating additional retention for pull-out bar 2 in cover profile 4. Cover profile 4 has a length that is slightly greater than the width of divider net 1. Once pull-out bar 2 and divider net 1 have been slid in, the opposite lateral ends of cover profile 2 are closed off by closure panels 5 that are secured detachably or nondetachably in or on the ends of cover profile 4. Closure panels 5 each carry on their outer sides a hooking elements 3 so as to secure cover profile 4, including divider net 1 and pull-out bar 2, in its pulled-out functional state in vehicle-mounted retainers in the roof region of the station wagon. In this functional state, divider net 1 projects approximately vertically upward and separates a passenger area from a cargo area of the station wagon.

The cargo area divider described with reference to FIGS. 1 through 4 can also be used in the same way with other motor vehicles. Cover profile 4 can be manufactured from plastic or from a lightweight metal alloy, and can be adapted in terms of visual appearance, shape, and color to the interior fittings of the motor vehicle or to the external appearance of a corresponding cassette housing for the roller-shade shaft. The interior fittings include panels, seating arrangements, fabrics, and the like.

Figure 1:
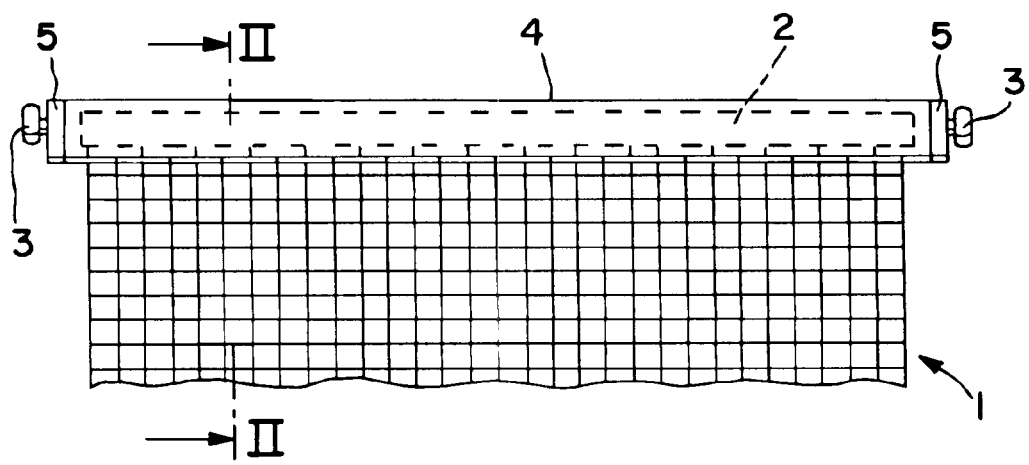
FIG. 1 shows, in a front view, an upper part of one embodiment of a cargo area divider for a motor vehicle according to the present invention.
Figure 2:
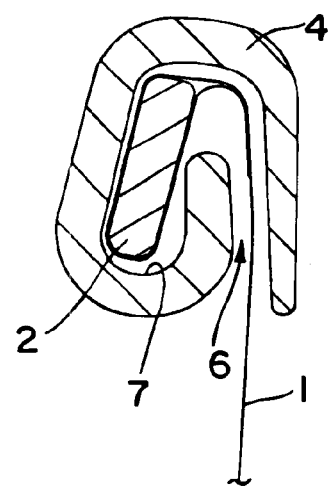
FIG. 2 shows a cross section through the cargo area divider shown in FIG. 1, in the region of a front end, along section line II—II in FIG. 1.

FIG. 5 illustrates the entire divider apparatus of FIGS. 1 and 2, in side elevation, in section. Housing 10 encloses and rotatably supports, in any suitable manner, roller-shade shaft 12. One end of net 1 will be affixed to roller-shade shaft 12 (such as by being inserted into a slot in roller-shade shaft 12, and affixed thereto in any suitable manner). Depending upon how far net 1 is unwound, a portion of net 1 may be wound one or more or less turns around roller-shade shaft 12. Roller-shade shaft 12 will be biased, such as by a spring arrangement, to be prompted to rotate, unless restrained, in the direction indicated by the arcuate arrow A.

Figure 3:
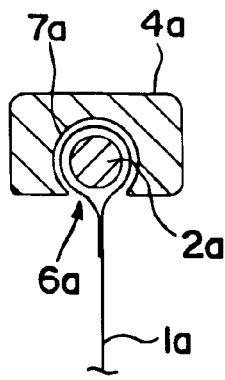
FIG. 3 schematically shows a cross section, in the region of a cover profile and a pull-out bar, of a further embodiment of a cargo area divider according to the present invention.
Figure 4:
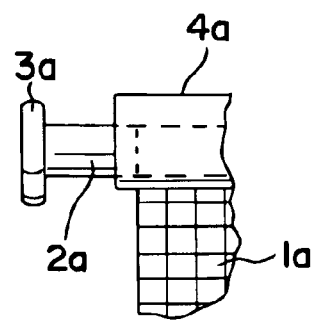
FIG. 4 shows, in a front view, a portion of a side region of the cargo area divider shown in FIG. 3.

In the case of the exemplary embodiment shown in FIGS. 3 and 4, a cover profile 4a that has a shape different from the cover profile shown in FIGS. 1 and 2 is associated with a divider net 1a in whose front end region is embedded a pull-out bar 2a analogous to the exemplary embodiment shown in FIGS. 1 and 2. Cover profile 4a has an almost rectangular cross section in which a channellike groove open toward the bottom, is provided as hollow chamber region 7a. Hollow chamber region 7a constituted by the groove is also configured so as to be open toward the opposite lateral ends of cover profile 4a to allow pull-out bar 2a, including the wrapped-around end region of divider net 1a, to be slid in laterally. Pull-out bar 2a has a circular cross section. Hollow chamber region 7a is correspondingly adapted and also has a circular cross section. Hollow chamber region 7a is continuously open toward the bottom over its entire length by way of a longitudinal slot 6a. The width of the longitudinal slot is smaller than the diameter of pull-out bar 2a.

In the exemplary embodiment shown in FIGS. 3 and 4, pull-out bar 2a projects on both sides beyond the lateral ends of cover profile 4a and is equipped at its ends with knob-like hooking elements 3a for securing directly into corresponding vehicle-mounted retainers. In contrast to the exemplary embodiment shown in FIGS. 1 and 2, hooking elements 3a are thus provided directly on pull-out bar 2a and not on cover profile 4a or on corresponding closure panels. In order to allow pull-out bar 2a to be slid laterally into cover profile 4a, hooking elements 3a preferably can be joined subsequently to the lateral ends in pull-out bar 2a. The knob-like hooking elements 3a can, in particular, be screwed into the lateral ends of pull-out bar 2a after pull-out bar 2a has been slid into cover profile 4a.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cargo area divider having a flexible planar structure that can be pulled out and is held at a rear end on a roller-shade shaft and at a front end is equipped with a pull-out bar that has a length which is at least as long as a width of the planar structure, wherein the pull-out bar is received within a hollow chamber region of a cover profile, which extends at least over the width of the planar structure, wherein the cover profile is provided with a longitudinal slot, wherein an end of the planar structure is attached to the pull-out bar, and extends from the pull-out bar, out through the longitudinal slot;

the hollow chamber region having a cross-sectional configuration which includes an outer leg and an inner leg, wherein the outer leg at least partially overlaps the inner leg to define an enclosure region which substantially surrounds the pull-out bar, and a passage, which connects the enclosure region with the longitudinal slot, which passage extends substantially off-center with respect to the enclosure region.

2. The cargo area divider as defined in claim 1, wherein the hollow chamber region of the cover profile has the same cross section continuously over its entire length, and is open toward both lateral ends.

3. The cargo area divider as defined in claim 2, wherein the cover profile has two open ends and the longitudinal slot, continuous over its length and extends from one open end to the other, the longitudinal slot further having a width which is smaller than a cross-sectional dimension of the pull-out bar.

4. The cargo area divider as defined in claim 2, wherein a closure panel which closes off the hollow chamber region is associated with each of opposite lateral ends of the cover profile.

5. The cargo area divider as defined in claim 2, wherein the pull-out bar is equipped with hooking elements for retention in vehicle-mounted retainers, which hooking elements extend beyond opposed ends of the cover profile.

6. The cargo area divider as defined in claim 2, wherein the cover profile is equipped at its opposite lateral ends with hooking elements for retention in vehicle-mounted retainers.

7. The cargo area divider as defined in claim 1, wherein the cover profile has two open ends and the longitudinal slot, is continuous over its length and extends from one open end to the other, the longitudinal slot further having a width which is smaller than a cross-sectional dimension of the pull-out bar.

8. The cargo area divider as defined in claim 7, wherein a closure panel which closes off the hollow chamber region is associated with each of opposite lateral ends of the cover profile.

9. The cargo area divider as defined in claim 7, wherein the cover profile is equipped at its opposite lateral ends with hooking elements for retention in vehicle-mounted retainers.

10. The cargo area divider as defined in claim 1, wherein a closure panel which closes off the hollow chamber region is associated with each of opposite lateral ends of the cover profile.

11. The cargo area divider as defined in claim 10, wherein the pull-out bar is equipped with hooking elements for retention in vehicle-mounted retainers, which hooking elements extend beyond opposed ends of the cover profile.

12. The cargo area divider as defined in claim 10, wherein the cover profile has, at least indirectly connected thereto, at opposite lateral ends thereof, hooking elements for retention in vehicle-mounted retainers.

13. The cargo area divider as defined in claim 12, wherein the hooking elements are provided on the closure panels.

14. The cargo area divider as defined in claim 1, wherein the pull-out bar is equipped with hooking elements for retention in vehicle-mounted retainers, which hooking elements extend beyond opposed ends of the cover profile.

15. The cargo area divider as defined in claim 1, wherein the cover profile has, at least indirectly connected thereto, at opposite lateral ends thereof, hooking elements for retention in vehicle-mounted retainers.

16. A method according to claim 1, wherein said forming a cover profile includes extruding said cover profile, wherein the slot has a continuous width along its length which is smaller than a cross-section of the pull-out bar.

17. A method according to claim 16, comprising providing hooking elements at respective opposite ends of the cover profile to enable the pulled out end of the cargo area divider to be hooked onto a structure in a vehicle.

18. A method according to claim 17, wherein the hooking elements are formed on ends of the pull-out bar.

19. A method according to claim 17, wherein the cover profile is provided with closure members at opposite ends thereof, and the hooking elements are formed on the closure members.

20. A method of making a cargo area divider for a vehicle which includes a flexible planar structure that can be pulled out and is held at a rear end on a roller shade shaft and at a front end is equipped with a pull-out bar, said method comprising:

forming a cover profile having a length at least as long as a width of the planar structure and having a slot along the length thereof, connecting the planar structure to a pull-out bar, and inserting the pull out bar into the cover profile in a transverse direction with the planar structure extending through the slot, providing the cover profile with a hollow chamber region having a cross-sectional configuration which includes an outer leg and an inner leg, wherein the outer leg at least partially overlaps the inner leg to define an enclosure region which substantially surrounds the pull-out bar, and a passage, which connects the enclosure region with the longitudinal slot, which passage extends substantially off-center with respect to the enclosure region.

* * * * *